(12) United States Patent
Daly

(10) Patent No.: US 7,069,542 B2
(45) Date of Patent: Jun. 27, 2006

(54) METHOD AND SYSTEM FOR INCREMENTAL ACTIONS RELATING TO NOTIFY AND TARGET MODELS

(75) Inventor: Ruth Sarah Daly, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 09/943,304

(22) Filed: Aug. 30, 2001

(65) Prior Publication Data
US 2002/0138820 A1  Sep. 26, 2002

(51) Int. Cl.
*G06F 9/44* (2006.01)

(52) U.S. Cl. ...................... 717/126; 717/116

(58) Field of Classification Search ......... 717/101–126
See application file for complete search history.

(56) References Cited

U.S. PATENT DOCUMENTS

| | | | |
|---|---|---|---|
| 5,446,842 A | 8/1995 | Schaeffer et al. | |
| 5,499,369 A | 3/1996 | Atkinson | |
| 5,519,862 A | 5/1996 | Schaeffer et al. | |
| 5,530,864 A | 6/1996 | Matheny et al. | |
| 5,608,909 A | 3/1997 | Atkinson et al. | |
| 5,613,124 A | 3/1997 | Atkinson et al. | |
| 5,732,263 A * | 3/1998 | Havens et al. | 707/103 R |
| 5,815,415 A | 9/1998 | Bentley et al. | |
| 5,857,211 A | 1/1999 | Carper et al. | |
| 5,862,372 A * | 1/1999 | Morris et al. | 717/109 |
| 5,987,242 A | 11/1999 | Bentley et al. | |
| 6,003,037 A * | 12/1999 | Kassabgi et al. | 707/103 R |
| 6,081,665 A * | 6/2000 | Nilsen et al. | 717/116 |
| 6,146,027 A | 11/2000 | Orton et al. | |
| 6,158,903 A | 12/2000 | Schaeffer et al. | |
| 6,298,476 B1 * | 10/2001 | Misheski et al. | 717/101 |
| 6,618,854 B1 * | 9/2003 | Mann | 717/124 |
| 6,971,110 B1 * | 11/2005 | Marks et al. | 719/318 |
| 2002/0100022 A1 * | 7/2002 | Holzmann | 717/126 |

OTHER PUBLICATIONS

Bernstein et al., A Vision for Management of Complex Models, Dec. 2000, SIGMOD Record, vol. 29, No. 4, pp. 55-63.*

Shibayama, How to Invent Distributed Implementation Schemes of an Object-Based Concurrent Language, Sep. 1988, OOPSLA '88 Proceedings, pp. 297-305.*

* cited by examiner

*Primary Examiner*—Tuan Dam
*Assistant Examiner*—Andre R. Fowlkes
(74) *Attorney, Agent, or Firm*—Sawyer Law Group LLP

(57) ABSTRACT

A system and method for performing an action on a target model associated with a notify model is disclosed. In the preferred embodiment of the present invention, the target model includes target objects and the notify model includes notify objects. The system and method comprises a model map for mapping each of the notify objects to an associated target object, and an action operator for performing the action on one or more target objects in the target model in response to a modification of the selected notify object. In the system and method, the action operator performs the action on one or more identified target objects associated with the modified selected notify object, the one or more identified target objects being determined with reference to the model map.

27 Claims, 6 Drawing Sheets

METHOD AND SYSTEM FOR INCREMENTAL ACTIONS RELATING TO NOTIFY AND TARGET MODELS

FIELD OF THE INVENTION

The present invention relates to development tools for computer applications and, more particularly, to a method and system of incremental actions relating to notify and target models.

BACKGROUND OF THE INVENTION

Computer applications continue to play an increasingly important role in the lives of individuals. Additionally, the desire by end-users for bigger, better and faster applications has also increased.

Unfortunately for application development teams, the applications have increased in complexity. As a result of this complexity, the time to develop applications has also increased. The demand for bigger, better and faster applications is often combined with the requirement that these new applications be provided to the market in ever shorter time frames.

As will be apparent, the market forces to develop bigger, better and faster applications in ever shorter times is in direct competition with the development team's need for longer times to develop these same applications. Accordingly, tools to assist a developer or development team in shortening the development cycle are desired.

In the present development environment, different models often represent the same data but in different formats. A model may be a collection of objects. The objects may, or may not, be of the same type.

For an example of the same data in different formats, consider the source code of an application under development. The source code, which forms a source object, is sometimes represented in two models: a model of files, and a model of objects. The data contained in the file is the same data that is contained in the object. To be specific, because the source file is code, each object, in the model of objects, is a metadata object. In information technology, the prefix "meta" often means "a description of". Metadata is a description of data; and in this example, metadata would name the parts of the source code: fields, methods, etc. Fields and methods are defined in the following paragraph.

In object oriented programming, an object often models a "real life" entity. For example, an object may be created to describe a rectangle. Variables or "fields" are identified to represent characteristics of all rectangles, namely the length and width. Procedures (known in the art as methods) would be present in the object to manipulate the length and width to generate other characteristics such as perimeter and area of a rectangle.

A model may comprise many different source code files. In fact, it is not uncommon for complex applications to comprise several million lines of source code distributed among thousands of separate files. Each source code file may describe several objects.

For the purpose of this document, "notify model" is used to represent a model(s) which, when changed, results in a signal, known as an "event notification", being issued which indicates that a change has occurred. "Target model" is used to represent a model(s) which, when a change has occurred in the notify model, either changes in response to that change, or is changed concurrently with the notify model change. As will be appreciated, the notification of a change only operates in one direction from the notify model to the target model.

It is known to those skilled in the art that programming code can be written, especially in object-oriented languages, to receive event notifications (i.e., the programming code is notified when certain changes occur).

Depending on the context, both source models and object models can be either a notify model, or a target model. To assist in the understanding of the notify and target models, the following examples illustrate three scenarios. In the first exemplary scenario, a file in the source model is changed and an object model is modified in response to the file change. In this first exemplary scenario the source model is the notify model, and the object model is the target model. In a second exemplary scenario a developer's tool changes an object model which causes new source code files to be created. In this second exemplary scenario the object model is the notify model, and the source model is the target model. In a third exemplary scenario source code is used as input for a tool. The tool generates new source code files, and, due to the existence of new code, an object model is updated. In this third exemplary scenario, the source code is both a notify and target model, and the object model is a target model.

As will be appreciated, a single instance of a notify model may consist of several models. Similarly, an instance of a target model may also consist of several models.

The notify and target model is exemplified in the use of computer code generators. Many applications presently exist to assist developers in generating code which, for many functions, is relatively easy to complete but quite time consuming to code and test. As a result of the laborious nature of producing some code, automatic code generators have been created. These automatic code generators, which often use a visual representation, or model, of the desired output, generate code which represents the graphical model produced.

For example, writing computer code for a graphical user interface (GUI), such as those common to most users of the Microsoft Windows operating system, is quite time consuming. To assist developers in generating the code for a GUI, automatic code generators have been created. These GUI code generators allow developers to work in a graphical development environment and select various user interface controls (e.g., radio buttons, drop down list boxes, selection boxes, etc.), typically using a "drag and drop" mechanism, and place the user interface controls in the graphical development environment representing a screen image to be presented to a user. When the developer has completed the graphical appearance, the developer instructs the development environment to generate the code which will implement the graphical representation created. In this example, the graphical representation of the user interface interacts with the object notify model, and the code automatically generated is the target mode. The automatic generation of code may be initiated by developer/user command (by, for example, selecting a menu item) or automatically when the developer saves the file—storing the graphical/notify model of the user interface. As can be appreciated, changes in the notify model (as represented by the graphical user interface, in this example) results in those changes being propagated to the target model (the actual computer source code for the user interface).

A further example of a notify model and a target model is the use of code generators with Enterprise JavaBeans™ ("EJB"). In this example, an EJB is created and forms part of a notify model. An automatic code generator, applied to the EJB, generates source code objects for the particular environment for which the source code is being deployed. These source code objects form the target model.

Development tools, such as automatic code generators, enable developers to spend more time on the functions which differentiate their applications from their competitors and less time writing code for common and relatively standard user interface attributes.

Additionally, it is common in the development environment to perform tests against the notify model or the target model to ensure compliance of the application under development with various requirements. These requirements may include, for example, compliance with specifications (such as industry standards), naming conventions, as well as many others. Ensuring compliance with a specification is often referred to as validating the code.

Presently, when a change in a notify model is completed, testing of the model (e.g., validating source code or the EJB in the examples described above, respectively) is conducted against the complete target model. Additionally, testing of the target model (e.g., validation of an object model) is commenced by user command. As will be appreciated, this can be extremely time consuming. Additionally, the user may fail to invoke the testing of the target model. As a result, testing of the code is often delayed to the end of the development cycle. Delaying testing often results in defects which could have been rectified earlier in the development cycle being identified late in the development cycle. Unfortunately, the problem is exacerbated when additional code, which depends on the defects in the original code, has been developed in the interim.

Accordingly, development tools which address some of the difficulties in application development are desired.

SUMMARY OF THE INVENTION

A system and method for performing an action on a target model associated with a notify model is disclosed. In the preferred embodiment of the present invention, the target model includes target objects and the notify model includes notify objects. The system and method comprises a model map for mapping each of the notify objects to an associated target object, and an action operator for performing the action on one or more target objects in the target model in response to a modification of a selected notify object. In the system and method, the action operator performs the action on one or more identified target objects associated with the modified selected notify object, the one or more identified target objects being determined with reference to the model map.

By utilizing the present invention, only the objects in the target model affected by the changes in the notify model are identified. Thus, the action (e.g., a validation check) is performed only on the affected parts of the target model. Advantageously, the incremental nature of this action identifies problems sooner, because the action can be run more often, since, given less input, it will not take as much time to complete. When problems are identified sooner, there is less opportunity for other code to become dependent on faulty behavior, and thus less chance that the fix for the faulty behavior will break other code. Consequently, this incremental nature of the action performed results in reduced testing time and thus increases the efficiency of a developer or a development team.

DETAILED DESCRIPTION

The present invention relates to development tools for computer applications and, more particularly, to a method and system of incremental actions relating to notify and target models. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
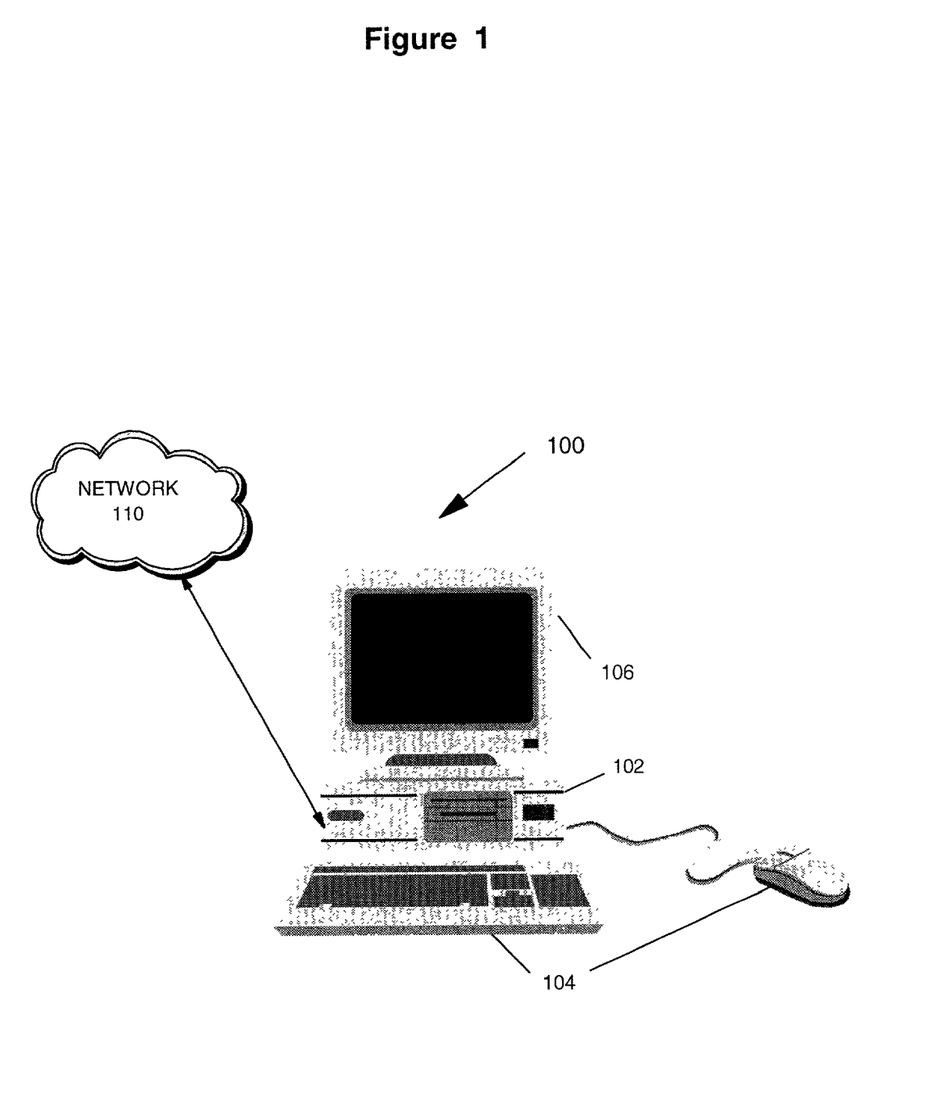
FIG. 1 schematically illustrates a computer system embodying aspects of the invention.

An embodiment of the invention, computer system 100, is illustrated in FIG. 1. Computer system 100, illustrated for exemplary purposes as a networked computing device, is in communication with other networked computing devices (not shown) via network 110. As will be appreciated by those of ordinary skill in the art, network 110 may be embodied using conventional networking technologies and may include one or more of the following: local area networks, wide area networks, intranets, public Internet and the like.

Throughout the description herein, an embodiment of the invention is illustrated with aspects of the invention embodied solely on computer system 100. As will be appreciated by those of ordinary skill in the art, aspects of the invention may be distributed amongst one or more networked computing devices which interact with computer system 100 via one or more data networks such as, for example, network 110. However, for ease of understanding, aspects of the invention have been embodied in a single computing device—computer system 100.

Computer system 100 includes processing system 102 which communicates with various input devices 104, output devices 106 and network 110. Input devices 104, two of which are shown, may include, for example, a keyboard, a mouse, a scanner, an imaging system (e.g., a camera, etc.) or the like. Similarly, output devices 106 (only one of which is illustrated) may include displays, information display unit printers and the like. Additionally, combination input/output (I/O) devices may also be in communication with processing system 102. Examples of conventional I/O devices include removable and fixed recordable computer readable media (e.g., floppy disk drives, tape drives, CD-ROM drives, DVD-RW drives, etc.), touch screen displays and the like. Computer readable media may be local to computer system 100 or remote (and accessed via a network 110).

Figure 2:
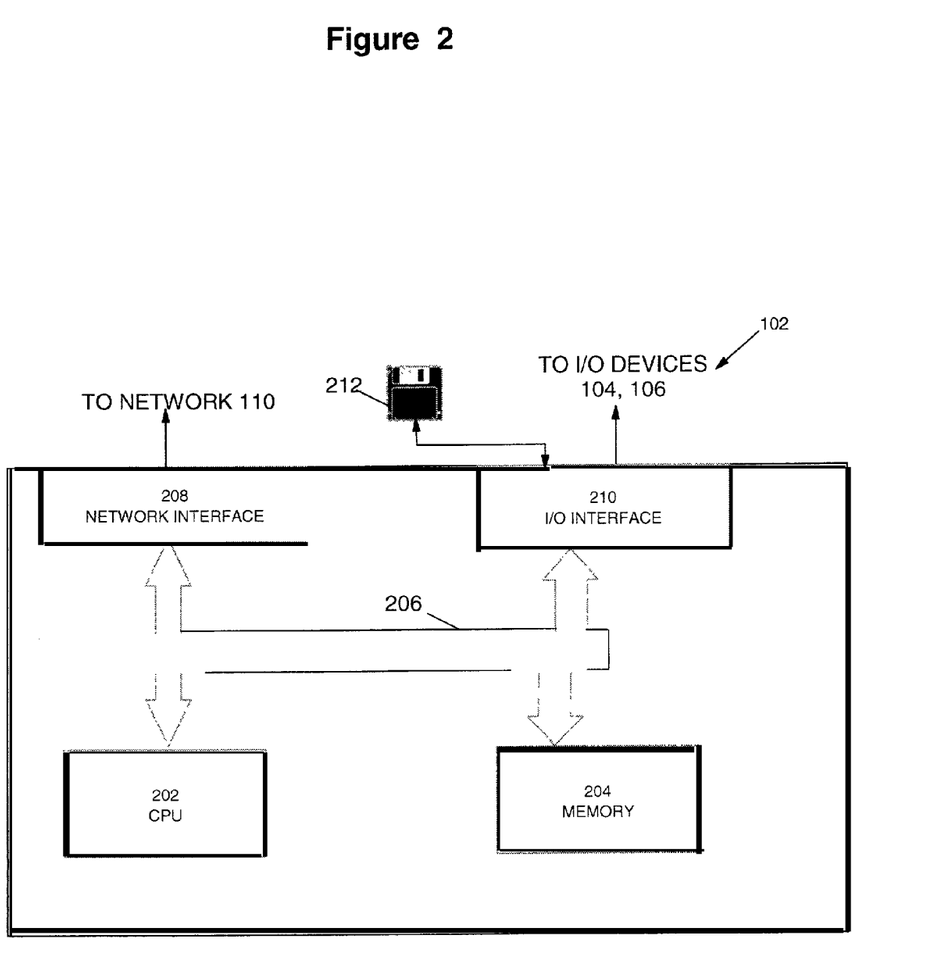
FIG. 2 schematically illustrates, in greater detail, a processing system in the computer system in accordance with a preferred embodiment of the present invention.

Exemplary processing system 102 is illustrated in greater detail in FIG. 2. As illustrated, processing system 102 includes several components—central processing unit (CPU) 202, memory 204, network interface (I/F) 208 and I/O I/F 210. Each component is in communication with the other components via a suitable communications bus 206 as required.

CPU 202 is a processing unit, such as an Intel Pentium™, IBM PowerPC™, Sun Microsystems UltraSparc™ processor or the like, suitable for the operations described herein. As will be appreciated by those of ordinary skill in the art, other embodiments of processing system 102 could use alternative CPUs and may include embodiments in which one or more CPUs are employed. CPU 202 may include various support circuits to enable communication between itself and the other components of processing system 102.

Memory 204 includes both volatile and persistent memory for the storage of: operational instructions for execution by CPU 202, data registers, application storage and the like. Memory 204 preferably includes a combination of random access memory (RAM), read only memory (ROM) and persistent memory such as that provided by a hard disk drive. The instructions stored by memory 204 may be received by computer system 100 as a data signal carrier from network 110.

Network I/F 208 enables communication between computer system 100 and other network computing devices (not shown) via network 110. Network I/F 208 may be 161 embodied in one or more conventional communication devices. Examples of a conventional communication device include an Ethernet card, a token ring card, a modem or the like. Network I/F 208 may also enable the retrieval or transmission of instructions for execution by CPU 202 from or to a remote storage media or device via network 110.

I/O I/F 210 enables communication between processing system 102 and the various I/O devices 104, 106. I/O I/F 210 may include, for example, a video card for interfacing with an external display such as output device 106. Additionally, I/O I/F 210 may enable communication between processing system 102 and a removable media 212. Although removable media 212 is illustrated as a conventional diskette other removable memory devices such as Zip™ drives, flash cards, CD-ROMs, static memory devices and the like may also be employed. Removable media 212 (which may be local or remote to computer system 100) may be used to provide instructions for execution by CPU 202 or as a removable data storage device.

Figure 3:
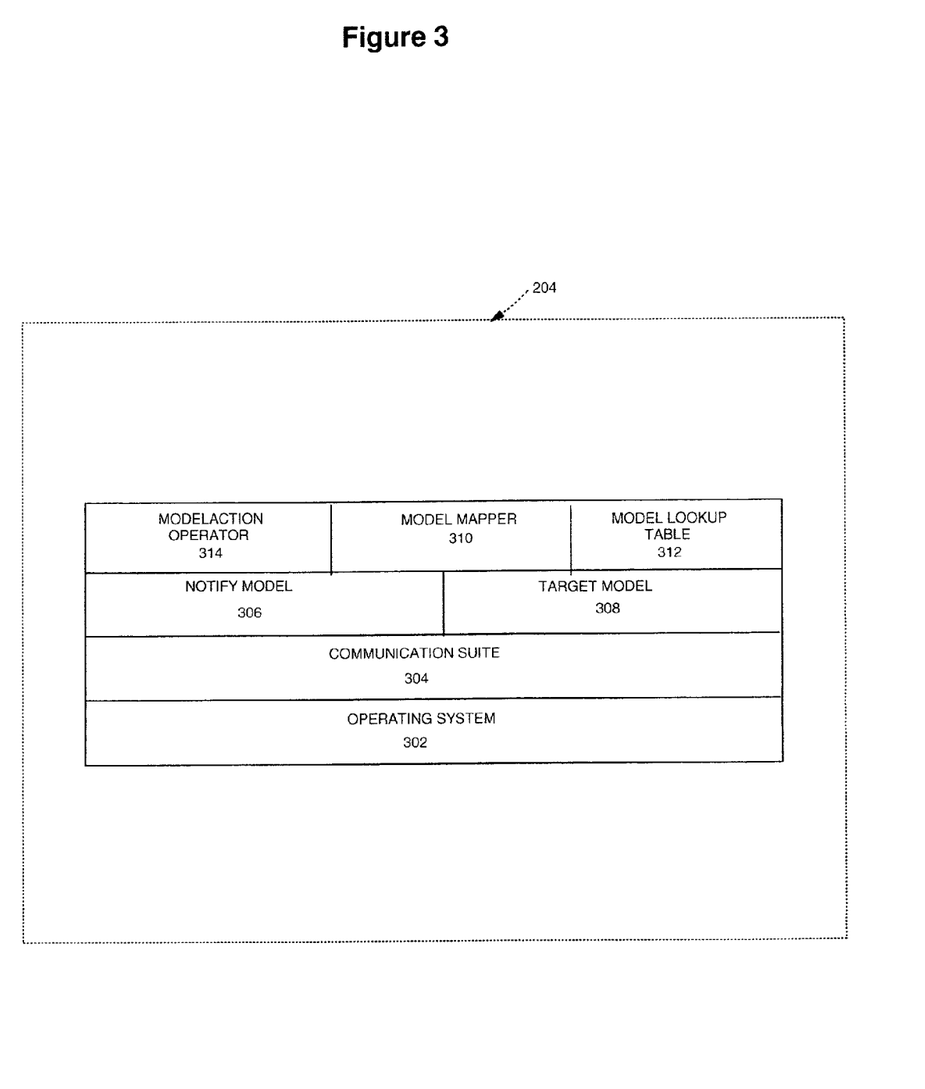
FIG. 3. illustrates, in functional block form, a memory module in the processing system in the computer in accordance with a preferred embodiment of the present invention.

The computer instructions/applications stored in memory 204 and executed by CPU 202 (thus adapting the operation of computer system 100 as described herein) are illustrated in functional block form in FIG. 3. As will be appreciated by those of ordinary skill in the art, the delineation between aspects of the applications illustrated as functional blocks in FIG. 3 is somewhat arbitrary as the various operations attributed to a particular application as described herein may, in alternative embodiments, be subsumed by another application.

As illustrated, for exemplary purposes only, memory 204 stores operating system (OS) 302, communications suite 304, notify model 306, target model 308, model mapper 310, mapping lookup table 312 and model action operator 314.

OS 302 is an operating system suitable for operation with a selected CPU 202 and the operations described herein. Multitasking, multithreaded OSes such as, for example, IBM AIX™, Microsoft Windows NT™, Linux or the like, are expected in many embodiments to be preferred.

Communication suite 304 provides, through, interaction with OS 302 and network I/F 208 (FIG. 2), suitable communication protocols to enable communication with other networked computing devices via network 110 (FIG. 1). Communication suite 304 may include one or more of such protocols such as TCP/IP, ethernet, token ring and the like.

Notify model 306 and target model 308 are related and represent the same data but in different formats. The general characteristics of notify model 306 and target model 308 is that changes made to the objects of notify model 306 are propagated to the target model 308.

For ease of understanding many examples included in the remainder of this specification describe an embodiment in which the notify model 306 is a graphical representation of a user interface created in a development environment such as the family of VisualAge® development products available from IBM Corporation. The target model 308 represents, in the exemplary embodiment, the source code files generated by the development environment based on the graphical/notify model 306 created by the developer. As such, changes made by the developer to the notify model 306 (e.g., adding/changing/deleting a new user interface element) may propagate changes to target model 308 when changes are saved by the developer.

Model mapper 310, which is preferably stored in a cache memory portion of memory 204 for quick retrieval, operates to collect, store and retrieve data which corresponds to the linkage between objects in notify model 306 and the corresponding objects in target model 308. The data corresponding to the linkages between notify model 306 and target model 308 forms mapping lookup table 312. Mapping lookup table 312 could be implemented in alternative manners including, for example, a database.

The granularity of the linkage or mapping information collected by model mapper 310 may vary depending upon the environment in which embodiments of the present invention are deployed. For many embodiments, collecting linkage data describing the linkage between a single object in notify model 306 (e.g., a user interface screen) and the object(s) in the target model 308 (e.g., the source code file automatically generated by the code generator) may provide sufficient detail. In this embodiment, the event captured by model mapper 310 would simply describe the linkage between the object(s) in notify model 306 and the corresponding object (e.g., a source code file(s)) in target model 308.

However, in alternative embodiments, a more detailed level of granularity may be preferred. For example, assume that the source code generator outputs object oriented source code files based on the graphical user interface model created by the developer. A developer may only alter/create a small number of new user interface objects during editing. As a result, the source code automatically generated by the code generator may differ only slightly from the previous version of generated source code (i.e., a few files which did not exist before). The difference may be, for example, minor changes to only a few of the object constructs in the source code file which includes several hundred objects. Model mapper 310 may, similar to the previous embodiment, collect data relating to the linkage between the graphical model of the user interface (which forms part of the notify model 306) and the source code file generated (which forms part of the target model 308). Additionally, in this latter embodiment, model mapper 310 may also collect data which identifies the linkages between portions in the graphical representation in the notify model 306 and the corresponding individual object-oriented constructs which form part of the source code file in the target model 308.

Model action operator 314, which in the exemplary embodiment operates as a validator to ensure that the objects of notify model 306 (e.g., an EJB) comply with a particular standard, operates to perform a specified action on objects in the notify model 306.

Although not illustrated, an editor of the objects of target model 308 may also be provided.

Figure 4:
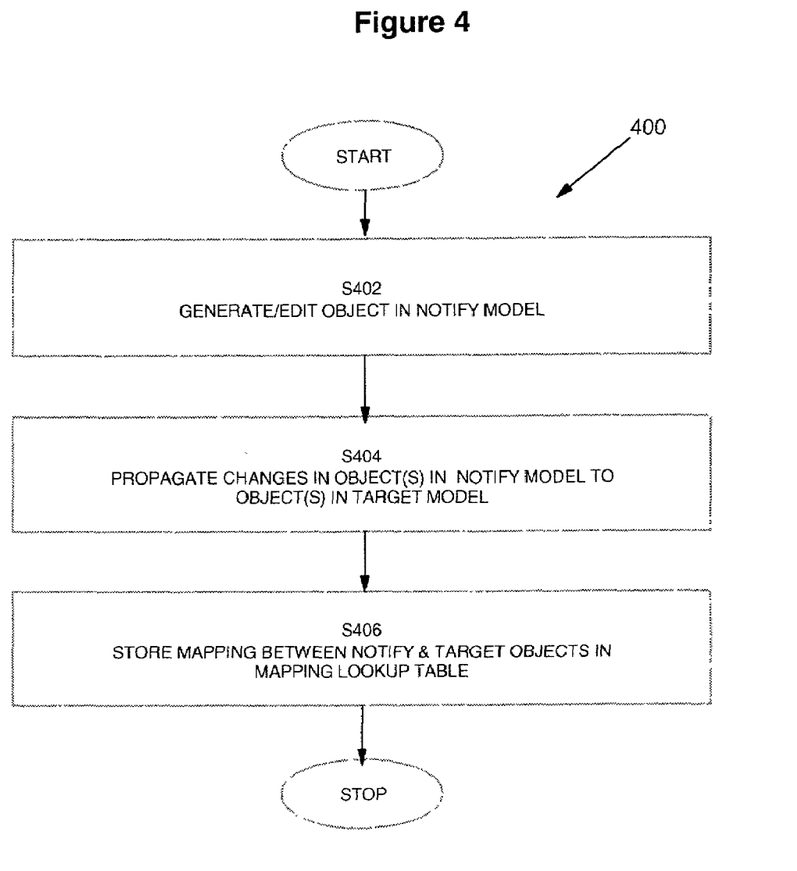
FIG. 4 is a flowchart of a process for generating a mapping lookup table in accordance with a preferred embodiment of the present invention.
Figure 5:
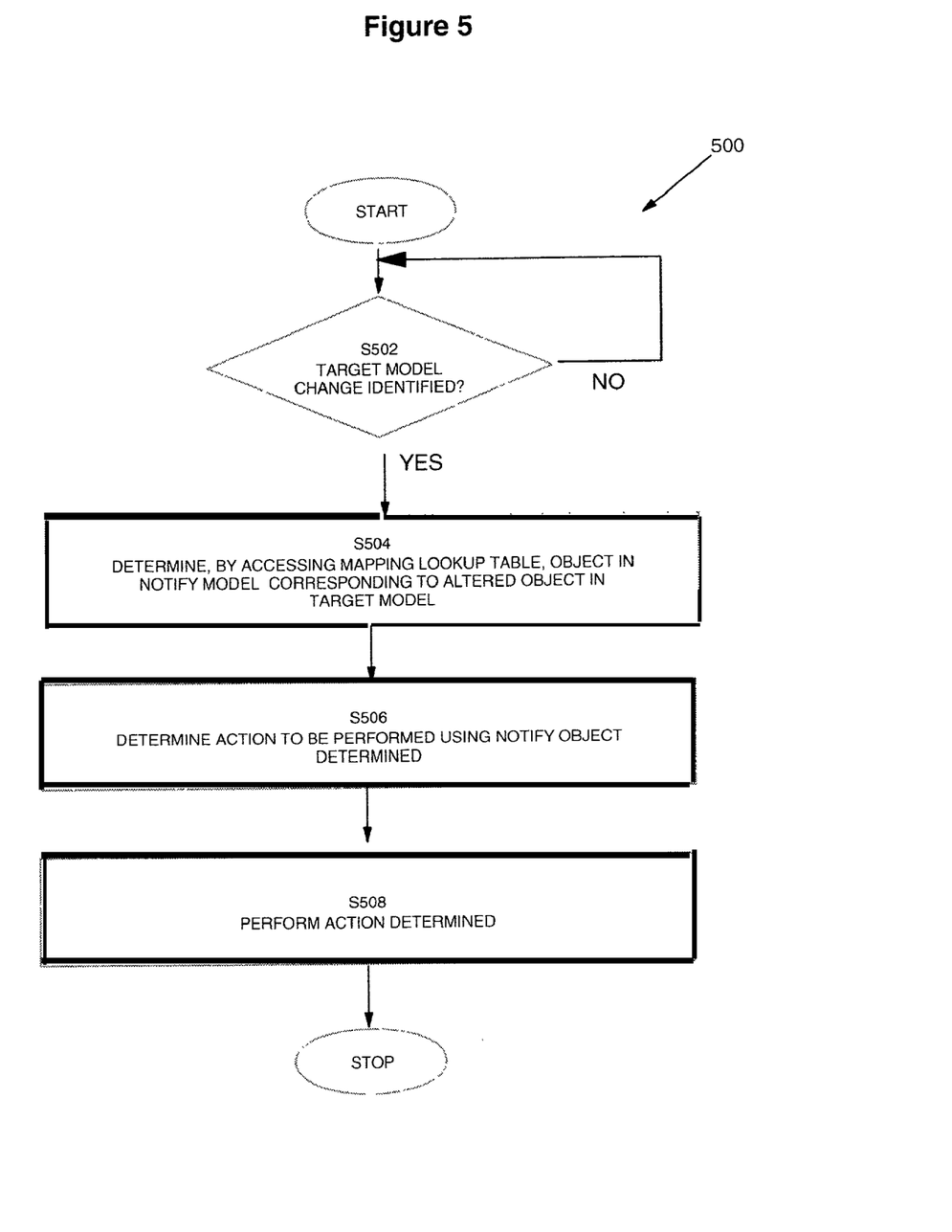
FIG. 5 is a flowchart of a process for performing an action on the notify model in accordance with a preferred embodiment of the present invention.
Figure 6:
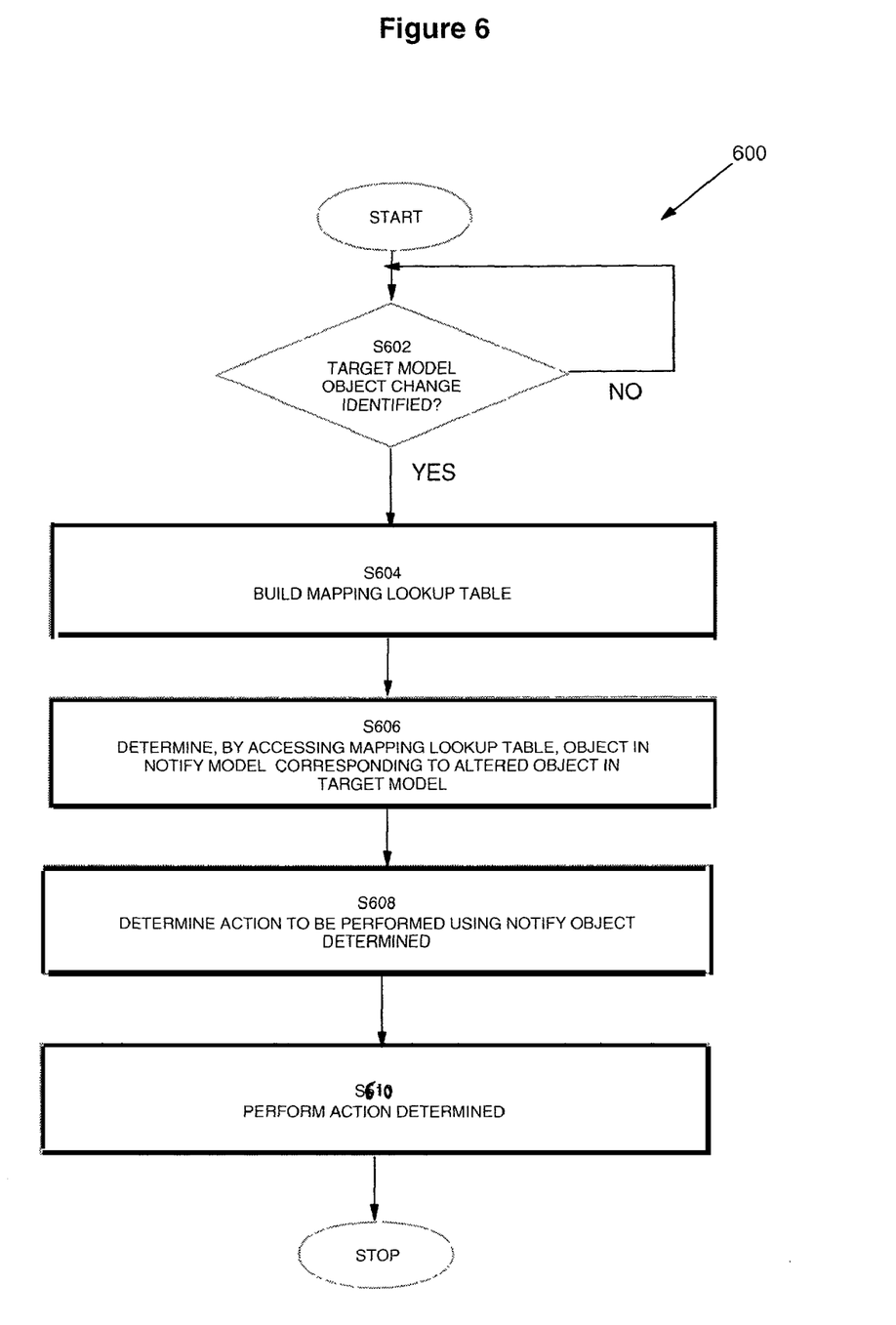
FIG. 6 is a flowchart of a process for performing an action on the notify model in accordance with a second embodiment of the present invention.

The operation of the exemplary computer system 100 is described in greater detail with reference to FIGS. 4 and 5. FIGS. 4 and 5 provide flowcharts describing the operations of computer system 100 depicted as operation 400. FIG. 6 illustrates a flowchart of a detail of an alternative and exemplary operation of computer system 100.

Operations 400 are performed to generate mapping lookup table 312 as notify model 306 is modified. Initially, an object in notify model 306 (e.g., an EJB or a GUI screen) is created or modified by a user (S402). As a result of the modifications by the user, the changes in an object in notify model 306 are propagated to one or more objects forming target object 308 (S404). In some embodiments, the changes will not propagate to target model 308 until an indication to do so is made by the user. Such an indication may be made, for example, by the user saving or storing a modified object in notify model 306. As such several modifications to a single object in notify model 306 may be propagated contemporaneously to one or more objects in target model 308.

Model mapper 310 is notified of the changes to notify model 306 that are propagated to target model 308. The notification of model mapper 310 may be made by, for example, issuance of an event notification message (which may be generated or issued by, for example, the development environment—e.g., a Visual Age® product). The notification identifies the objects changed in notify model 306 and the corresponding changes in target model 308. For example, a single EJB may have been modified in notify model 306. This may result in several objects (e.g., several object classes) in target model 308 being similarly modified. Identity data describing the identify of both the single EJB in notify model 306 and the several objects (e.g., several object classes) in target model 308 will be collected by model mapper 310 and used to generate mapping lookup table 312.

Mapping lookup table 312 provides a notify model object—target model object correlation.

In alternative embodiments, finer granularity of the linkages between objects in notify model 306 and target model 308 could also be described by mapping lookup table 312. For example, model mapper 310, in addition to identity data collected which identifies objects modified in the notify and target models 306, 308, could also collect additional data which correlates portions of objects modified in notify model 306 to the corresponding portions of objects in target model 308. For example, assume an object in notify model 306 represents an EJB which describes several methods. The EJB, when passed to a code generator, results in several (e.g., three) class objects being created. However, in this example the modification of a single method in the EJB results in a modification of a single method in one of the three class objects. A model mapper 310 which collects very detailed linkage data may populate mapping lookup table 312 with identity data (corresponding to the identity of the modified objects—the single EJB in the notify model 306 and the single class object in the target model) and data corresponding to the actual modifications made (e.g., the methods changed in each of the objects identified).

As a consequence of operations 400, mapping lookup table 312 is created which provides linkage data correlating the objects in notify model 306 to the objects in target model 308.

Operations 500 (FIG. 5) are performed by computer system 100 when an event notification is issued (by, for example, the development environment) which corresponds to the modification of the target model 308 only (i.e., a modification to target model 308 which is not the result of propagating changes from notify model 306). When an event notification indicating this condition is identified (S502), the model action operation 314 accesses mapping lookup table 312 to determine the object in notify model 306 which corresponds or is associated with the modified object in target 306 (S504). Once the associated object in notify model 306 has been determined, the proper action to be performed (e.g., identification of the proper specification for testing the EJB) is determined based on the object from notify model 306 identified (S506), and the action determined is performed (e.g., compliance with the identified specification) (S508).

As a consequence of operations 500 only those objects in notify model 306 which correspond to the modified objects in target model 306 will be operated on by model action operator 314. In the examples described above, this will result in only a limited number of the objects (e.g., EJBs) in notify model 306 being tested against the requisite specification. This incremental application of action operator 314 (i.e., only applying the action, such as compliance testing, or code generation, to those target objects which have been altered) is in contrast to present systems which require a complete testing, or generation, or regeneration, of notify model 306 to be performed. The incremental application of action operator 314 to only those object in notify model 306 which are affected by changes to objects in target model 308 significantly improves the performance of the development environment.

An alternative embodiment to the operations 400 and 500 is illustrated in FIG. 6 as operations 600. In this alternative embodiment, mapping lookup table 312 is created only upon notification of an event describing a change in target model 308 (S602). Upon identification of a notification event, mapping lookup table 312 is created (S604). Mapping lookup table 312 can be created by traversing the objects in target model 308 to create a notify object—target object pair.

A traversal could be through links in objects, or through a list of files, etc. When traversing, given the current identifying item (e.g. an object, or a file), the developer, who understands the representations in the notify model(s) and target model(s), understands what part of the identifying item corresponds to which part of the target model. For example, the part could be the file itself; if it is a Java file, and that file contains the definition of a public class, then a developer who programs in Java knows that the name of the Java file is the name of the object. (This is a rule of Java.) Given that the developer understands the models, and the rules which pertain to each type of model, a relationship between the models can be deduced, and coded.

Once mapping lookup table 312 has been created, operations S606–S610, which are similar to operations S504–S508 (FIG. 5) and described above, are performed.

By operation of the above described embodiment of the invention, improved validation of a target model can be performed. For example, assume model A stores information about employers and model B stores information about employees. Models A and B are not necessarily stored in the same location. Assume additionally that a model C stores information about companies and model D stores information about persons. Models C and D are also not necessarily stored in the same location. In this example, models A and B form part of a notify model and models C and D form part of a target model.

If a change is made to an employer, say they hire 100 people, that will have an immediate effect on employee model B. The change in model B affects person model D. Embodiments of the invention (through the operation of mapping the linkage between the models and use the lookup table), will isolate the change from model B and perform whatever action is needed against model D. These operations provide improved performance as compared to those validation systems presently available.

In a further example of the exemplary embodiment, if model A is changed because an employer is added, this will affect company model C directly and employee model B (because a new company hires people). Embodiments of the invention can isolate what portion of model C is affected directly and those portions in model B that are also affected. The action performed (e.g., code validation) can then performed on those affected portions which, compared to other validation systems, results in improved validation performance.

In alternative embodiments, the mapping lookup table may be created, or retrieved, or retrieved and refreshed (for example, deletions do not require population), by an explicit action on the part of the user. For example, say that the user is interacting with a graphical user interface, and that the user presses a button on that interface. Instead of responding to an event change notification in the notify model, the mapping lookup table responds to the explicit action, and is populated, or retrieved, or retrieved and refreshed, based on the entire contents of the notify model/target model pairings. From then on, the incremental action could continue as explained before.

Alternatively, the mapping lookup table could be created in its entirety, either through an event notification, or through an explicit action done by the user. And when another event notification occurs, the existing model cache is retrieved, or retrieved and refreshed with the data (as indicated by the event notification), and then the incremental action could continue as explained before.

The mapping lookup table may, in various embodiments, also be updated with linkage data upon the creation or modification of a notify model. Accordingly, in addition to performing an action on objects in the target model upon receipt of a notification event (e.g., validating portions of source code forming part of the target model), the mapping lookup table may also be updated to reflect any changes in the linkage between the notify model and the target model.

Those of ordinary skill in the art will now appreciate that embodiments of the present invention may advantageously perform an action (e.g., validation) that is triggered automatically whenever a notify model has been modified. Additionally, and advantageously, embodiments of the invention perform the action only on those portions which have been modified. These advantages provide for a reduction in the time required to perform an action (e.g., validation). This provides improved performance while reducing the action (e.g., validation) input space.

As will be appreciated, the embodiments described herein could equally be applied to performing an action of the notify model rather than on the target model. However, it is believed that performing the required action against the target model will, in many embodiments, provide improved performance.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer system for performing an action on a target model, wherein the target model is associated with a notify model, the target model comprising target objects and the notify model comprising notify objects, the computer system comprising:
   a model map for mapping the notify objects of the notify model to associated target objects in the target model; and
   an action operator for performing the action on one or more target objects in the target model in response to a modification of a selected notify object;
   wherein, the action operator performs the action on one or more identified target objects associated with the modified selected notify object, the one or more identified target objects being determined with reference to the model map.

2. The computer system of claim 1 wherein the notify model is a model of an object in an object oriented computer language and wherein the target model is source code associated with the object.

3. The computer system of claim 1 further comprising means for generating an event notification signal when the selected notify object is modified, wherein the action operator performs the action responsive to receipt of the event notification signal.

4. The computer system of claim 1 wherein the model map is one of a lookup table and a database.

5. The computer system of claim 4 wherein the model map maps portions of the notify objects to associated portions of the target objects.

6. The computer system of claim 5 wherein; the action performed by the action operator is performed on the identified portions of the target objects in the target model, the identified portions of the target object being determined with reference to the model map.

7. The computer system of claim 6 wherein the notify model is a model of an object in an object oriented language and wherein the target object is source code.

8. The computer system of claim 7 wherein the action performed is a source code validation.

9. A method for performing an action on a target model, wherein the target model is associated with a notify model, the target model comprising target objects and the notify model comprising notify objects, the method comprising:
   a) mapping the notify objects of the notify model to associated target objects in the target model; and
   b) performing the action on one or more identified target objects associated with the selected notify object in response to modifying a selected notify object, the one or more identified target objects being determined with reference to the mapping.

10. The method of claim 9 wherein the mapping step (a) comprises the step of:
   a1) collecting data corresponding to linkages between the notify objects and the target objects.

11. The method of claim 10 wherein the mapping step (a) further comprises the step of:
  a2) storing the data collected in one of a lookup table and a database.

12. The method of claim 9 further comprising the step of:
  c) receiving event notification data identifying the selected notify object prior to the performing the action.

13. The method of claim 10 wherein the reference to the mapping comprises retrieving target identity data identifying the one or more target objects associated with the selected notify object from the mapping.

14. The method of claim 9 wherein the mapping generates one of a lookup table and a database.

15. The method of claim 9 wherein the action performed on the one or more identified target objects comprises code validation.

16. A computer readable medium containing program instructions for performing for an action on a target model, wherein the target model is associated with a notify model, the target model comprising target objects and the notify model comprising notify objects, the program instructions for:
  a) mapping the notify objects of the notify model to associated target objects in the target model; and
  b) performing the action on one or more identified target objects associated with the selected notify object in response to modifying a selected notify object, the one or more identified target objects being determined with reference to the mapping.

17. The computer readable medium of claim 16 wherein the mapping instruction (a) comprises instructions for collecting data corresponding to linkages between the notify objects and the target objects.

18. The computer readable medium of claim 17 wherein the mapping instructions (a) further comprise storing the data collected in one of a lookup table and a database.

19. The computer readable medium of claim 16 further comprising the instruction for:
  c) receiving event notification data identifying the selected notify object prior to the performing the action.

20. The computer readable medium of claim 17 wherein the performing instruction comprises retrieving target identity data identifying the one or more target objects associated with the selected notify object from the mapping.

21. The computer readable medium of claim 16 wherein the mapping instruction generates one of a lookup table and a database.

22. The method of claim 16 wherein the action performed on the one or more identified target objects comprises code validation.

23. A computer implemented method for performing an action on a target model, wherein the target model is associated with a notify model, the target model comprising target objects and the notify model comprising notify objects, the method comprising:
  mapping the notify objects of the notify model to associated target objects in the target model; and
  performing the action on one or more identified target objects associated with the selected notify object in response to modifying a selected notify object, the one or more identified target objects being determined with reference to the mapping.

24. The computer implemented method of claim 23 wherein the action is code validation on one or more identified target objects.

25. A source code validator for validating source code forming a target object in a target model, the target model comprising a plurality of target objects, the target model associated with a notify model, wherein notify objects comprising the notify model are associated with one or more target objects in the target model and wherein modifications to a notify object in the notify model are propagated to one or more target objects in the target model, the source code validator for:
  performing code validation on one or more identified target objects associated with a selected notify object, the one or more identified target objects being determined with reference to a map of the associations between the notify objects in the notify model and the target objects in the object model.

26. The source code validator of claim 25 for collecting and storing data corresponding to linkages between the notify objects and the target objects in one of a lookup table and a database.

27. A method for performing an action on at least one of a target model and a notify model, wherein the at least one target model is associated with the notify model, the target model comprising target objects and the notify model comprising notify objects, the method comprising the steps of:
  a) mapping the notify objects of the notify model to associated target objects in the target model; and
  b) performing the action on a selected notify object and an identified target object associated with the selected notify object, the identified target object determined with reference to the mapping.

* * * * *

UNITED STATES PATENT AND TRADEMARK OFFICE
CERTIFICATE OF CORRECTION

PATENT NO. : 7,069,542 B2  Page 1 of 1
APPLICATION NO. : 09/943304
DATED : June 27, 2006
INVENTOR(S) : Daly It is certified that error appears in the above-identified patent and that said Letters Patent is hereby corrected as shown below:

Front Page

Add:

Item (30), Foreign Application Priority Data

March 12, 2001  (CA)   ………….......  2340472

Signed and Sealed this

Tenth Day of October, 2006

JON W. DUDAS
*Director of the United States Patent and Trademark Office*